United States Patent
Doering et al.

[11] Patent Number: 5,216,273
[45] Date of Patent: Jun. 1, 1993

[54] MICROVALVE OF MULTILAYER SILICON CONSTRUCTION

[75] Inventors: Christian Doering; Thomas Grauer, both of Stuttgart; Michael Mettner; Armin Schuelke, both of Ludwigsburg; Jiri Marek, Reutlingen; Hans-Peter Trah, Reutlingen; Joerg Muchow, Reutlingen; Martin Willmann, Reutlingen, all of Fed. Rep. of Germany

[73] Assignee: Robert Bosch GmbH, Stuttgart, Fed. Rep. of Germany

[21] Appl. No.: 762,940

[22] Filed: Sep. 19, 1991

[30] Foreign Application Priority Data

Nov. 10, 1990 [DE] Fed. Rep. of Germany ....... 4035852

[51] Int. Cl.⁵ .................... H01L 29/66; H01L 29/84; H01L 29/96; F16K 31/02
[52] U.S. Cl. .................... 257/419; 257/619; 251/129.17
[58] Field of Search ............. 357/26; 251/129.17; 257/419, 619

[56] References Cited

U.S. PATENT DOCUMENTS

| | | | |
|---|---|---|---|
| 4,581,624 | 4/1986 | O'Connor | 357/26 |
| 4,821,999 | 4/1989 | Ohtaka | 357/26 |
| 4,824,073 | 4/1989 | Zdeblick | 357/26 |
| 4,826,131 | 5/1989 | Mikkor | 251/129.17 |
| 4,908,693 | 3/1990 | Nishiguchi | 357/26 |
| 5,065,978 | 11/1991 | Albarda et al. | 251/129.17 |

FOREIGN PATENT DOCUMENTS

| | | |
|---|---|---|
| 3621331A1 | 1/1988 | Fed. Rep. of Germany . |
| 3621332A1 | 1/1988 | Fed. Rep. of Germany . |
| 02133968 | 5/1990 | Japan ........ 357/26 |
| WO90/12209 | 10/1990 | PCT Int'l Appl. . |

Primary Examiner—Rolf Hille
Assistant Examiner—Mahshid Saadat
Attorney, Agent, or Firm—Frishauf, Holtz, Goodman & Woodward

[57] ABSTRACT

A microwave is made of a stack of layers. A sculptured silicon substrate is held between two covers each consisting of one or more layers. The inlet and the outlet of the microvalve are formed by perforations in the respective covers. A central valve plate is sculptured out of the silicon substrate with surfaces respectively facing the two covers in the region of the inlet and outlet in a symmetrical fashion. The valve plate is connected to the outer frame portion of the silicon substrate by one or more silicon strips. The valve plate is also shaped as a closure member near the inlet and/or the outlet. Electrodes are provided on the covers opposite the valve plate so that the valve can be electrostatically actuated with the valve plate serving as counterelectrode for these electrodes on the covers.

26 Claims, 2 Drawing Sheets

MICROVALVE OF MULTILAYER SILICON CONSTRUCTION

BACKGROUND AND PRIOR ART

This invention concerns microvalves made of many layers of material of which at least one layer is a silicon mounting frame and the device is provided with an inlet, an outlet, at least one valve seat and at least one closing member, as well as means for electrostatic actuation of the at least one closing member.

A microvalve built in essentially three layers is known from British Patent Disclosure 21 55 152 A and the corresponding U.S. Pat. No. 4,581,624. In that device an inlet and an outlet as well as a valve are provided in a silicon carrier layer. An intermediate layer is provided on the silicon carrier layer and on that intermediate layer a cover layer is applied. These layers form an internal space that provides the pressure medium connection between the connections to the outside of the device. The cover layer is constructed to serve also as a membrane in which there is integrated a closing member cooperating with the valve seat. In the operation of this microvalve an electrostatic actuation device disposed on the membrane may not overcome either the forces of the resilient membrane or the pressure of the fluid present at the input, because the membrane closing the valve seat faces and is subject to this pressure without compensation.

THE INVENTION

It is an object of the present invention to provide a microvalve with a double action drive which makes possible an active opening and an active closing of the valve. It is a further object of the invention to provide a microvalve which can be made by a sandwich construction which allows freedom from stresses on the structure during its manufacture.

Briefly, the carrier member for the sculptured or structurized silicon portion of the valve is in the form of a carrier frame disposed between two covers, each of one or more layers. The valve inlet is provided by a perforation in one of the two covers and the outlet by a perforation in the other cover. There is a formed from the silicon carrier layer, in the region of the inlet and of the outlet, an essentially symmetrical valve plate having surfaces respectively facing the inlet and outlet provided in the cover layers. The valve plate is connected with the frame portion of the silicon carrier by at least one flexible strip and is formed as a closing member in the region of the inlet and/or the outlet. The electrodes are disposed opposite the covering layers of the valve plate and the valve plate operates as counterelectrode for those electrodes.

It is particularly advantageous for the inlet and outlet to be arranged opposite each other. It is also particularly advantageous for the cover layers facing the silicon carrier to be glass layers.

The arrangement of the inlet and outlet opposite each other has the advantage that inlet and outlet are separated from each other, which provides substantial advantages for the construction of the system. There is also an advantage in having at least one closing element made out of the electrostatically actuatable valve plate and for this valve plate at the same time to serve as a movable electrode of the electrostatic drive.

The use of glass layer covers for providing the inlet and outlet facing the silicon valve plate is also advantageous. In such a case, metallization on the covers can be used as electrodes. They can be made of aluminum by vapor deposition or by sputtering. It is also convenient to provide electrode connections in the form of metallization by means of etching channels in the structurized substrate carrier and for these to lead to the outside of the microvalve.

It is also useful to utilize silicon substrate members also for the covers. In that way the inlet and outlet holes can be produced simply by an etching process. The electrical insulation of the structurized silicon carrier with respect to the covers can in such a case be provided simply by silicon oxide layers or glass layers. A particular advantage of this arrangement is that electrodes as well as the electrode connections can be simply diffused into the silicon material of the covers. In that way it is not necessary to provide metallic electrode connections to the outside of the valve by etched channels in the structurized silicon wafer and this also avoids a following process for sealing the valve against leakage. A further advantage of electrodes diffused into the silicon is that the flow properties of the valved fluid are not disturbed by a step in the surface on the inside of the valve.

The valve plate can advantageously have a sealing lip which can be pressed against the valve seat around the inlet or outlet. In the case in which only one such lip is provided which can be pressed against the valve seat of the outlet, it is advantageous to provide on the surface of the valve plate opposite the lip at least one spacer for preventing closing of the valve on the inlet side when the valve on the outlet side is open. It is important for the sealing lips and/or spacers to be so disposed on the valve plate that they do not come into contact with the electrodes or electrode connections when they touch the cover elements, and thus to avoid short-circuiting the electrostatic drive.

Groove-like indentations in the surfaces of the valve plate facing the valve cover structures allow the through-flow and stream behavior of the valved fluid to be to a great extent independent of the dimensioning of the electrostatic drive. The microvalve of the invention can be used either as a switching valve or as a continuously variable control valve.

DRAWINGS

The invention is further described by way of illustrative example with reference to the annexed drawings, in which.

DESCRIPTION OF THE ILLUSTRATED EMBODIMENTS

Figure 1:
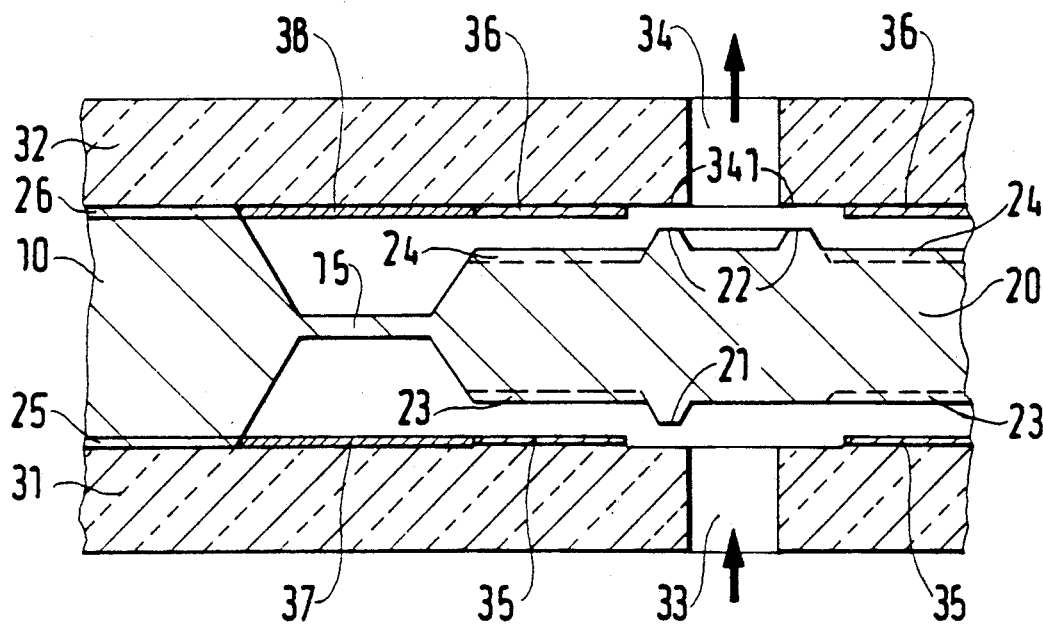
FIG. 1 is a cross section, partly broken off at the left and right, of a switching valve according to the invention.

FIG. 1 shows a longitudinal section through a single microvalve made in a multilayer structure, in a representation which is greatly magnified and simplified.

Production technologies for the manufacture of this multilayer structure usable for this device are known from micromechanics and semiconductor technology. Isotropic and anisotropic etching of silicon and the structurizing of glass are preferred processes. These technologies particularly for manufacturing three-dimensional shapes in a multilayer structure and their capability for producing certain mechanical elements by structure details are here recognized as being very well known.

The microvalve of FIG. 1 has a structurized silicon carrier 10 which provides the middle layer of the device and two covers 31 and 32 applied to the opposite sides of the silicon carrier 10. The material for the two covers 31 and 32 in the illustrative example shown in FIG. 1 can advantageously be glass, which is particularly suitable for these covers, since the bonding between the structurized silicon carrier 10 and the covers 31 and 32 can then be simply produced in manufacture by anodic bonding. The cover unit 31 has a perforation which serves as the inlet 33. There is a perforation 34 which serves as the outlet in the other cover 32 and is disposed opposite the inlet 33. A movable valve plate 20 is shaped out of the silicon wafer 10, between the covers 31 and 32 in the region of the inlet 33 and the outlet 34. The valve plate 20 is connected with the rest (frame) of the silicon carrier 10 by means of one or more strips 15 so that the valve plate is suspended essentially symmetrically with its surfaces respectively facing the covers 31 and 32. The valve plate can be connected to the silicon frame 10 either unsymmetrically on one side or symmetrically on both sides or even in star fashion on all sides. In the construction of this microvalve attention should be given to assure that there is a sufficiently great opening between the suspension strips 15 so that an adequate quantity of fluid can reach the outlet from the inlet.

A seal in the form of a lip 22 is formed on the valve plate 20 around the region of the outlet 34. It can be pressed against the valve seat 341 around the outlet 34 to make a tight closure. That closure is produced by electrostatic actuation of the valve plate 20. Electrodes 35 and 36 having electrode connection conductors 37 and 38 are respectively provided on the covers 31 and 32 in the region of the valve plate 20. A simple possibility for providing the electrodes 35 and 36 and the electrode connections 37 and 38 in this example is an applied metallization, for example aluminum applied by vapor deposition or sputtering.

By applying a voltage between the electrode 35 or 36 and the valve plate 20, the valve plate can be moved either in the direction of the cover 32, therefore in the direction of the outlet, or else in the direction of the cover 31, thus in the direction of the inlet. That means that the valve of the invention can be actively closed and likewise actively opened. In order to prevent the inlet 33 from being closed when the valve opens on the outlet side, a spacer 21 is integrally provided on the valve plate 28 in the region of the inlet 33. In order to prevent a short circuit between the valve 20 operating as a counter electrode and either of the electrodes 35 and 36 or the electrode connections 37 and 38, the sealing lip 22 and the spacer 21 are so disposed that in case they touch respectively the covers 31 and 32, they do not come into contact with the electrodes 35 and 36 or the electrode connections 37 and 38. The electrode connections 37 and 38 are guided through etched channels 25 and 26 in the silicon carrier 10 to the exterior of the microvalve. These etched channels 25 and 26 must be suitably made fluid-tight.

Figure 3:
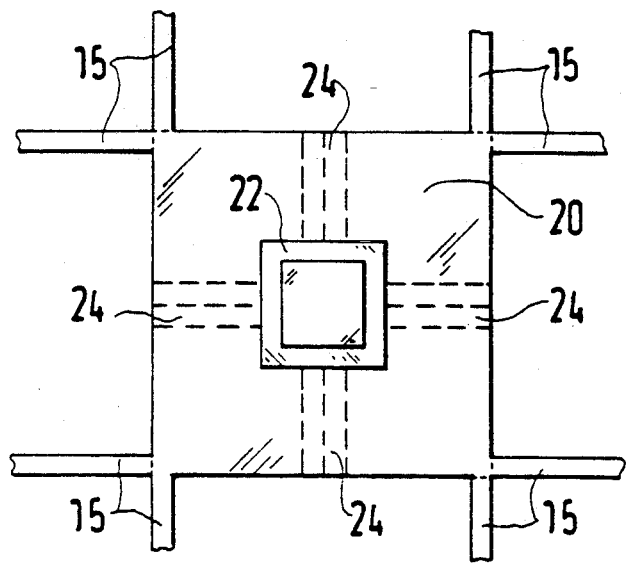
FIG. 3 is a top view of the valve plate of the valve shown in FIG. 1 or FIG. 2.

Groove-like etched troughs 23 and 24 can be provided in the valve plate 20 for improving the supply or expulsion of fluid, as shown in FIG. 3. FIG. 3 shows a top view of one possible embodiment of the valve plate 20 shaped out of the central silicon wafer. The valve plate 20 is made square or rectangular and has a frame-shaped seal lip 22 rising above the surface of the valve plate 20 in its middle. The groove-like etched troughs 24 extend outward from the seal lip 22 to the edge of the valve plate 20. Eight thin strips 15 which extend outward from the corners of the valve plate 20 connect the valve plate 20 to the silicon carrier frame 10. The invention is not limited, however, to this particular number, arrangement or construction of the strips 15 and of the etched troughs and extends rather to all useful variants for accomplishing the particular function of the microvalve.

Figure 2:
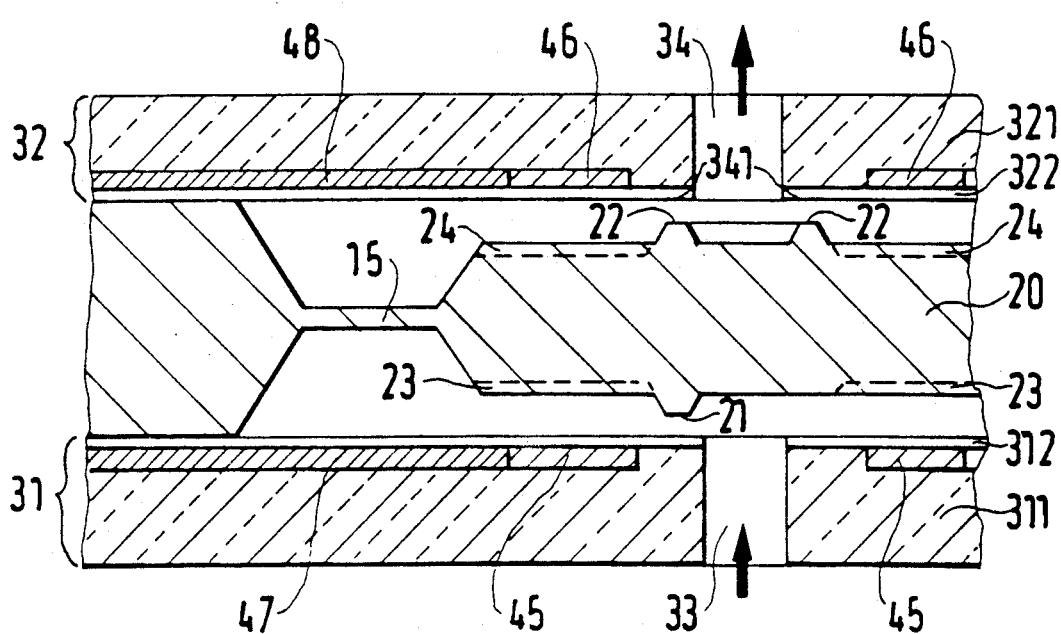
FIG. 2 is a cross section of another switching valve.

FIG. 2 shows a longitudinal section through a microvalve which is constituted essentially in the same way as the microvalve shown in FIG. 1, with a structure-shaped silicon carrier 10 which has a valve plate 20, equipped with a seal lip 22 in the direction of the outlet 34 and a spacer 21 in the direction of the inlet 33, the valve plate being suspended on thin strips 15. Furthermore, there are also groove-like etched troughs 23 and 24 provided on the upper surface of the valve plate 20. In the microvalve shown in FIG. 2, however, the covers 31 and 32 are formed from silicon substrates 311 and 321 on which silicon oxide layers 312 and 322 are respectively deposited on their surfaces facing the silicon wafer 10. These oxide layers are present between the respective covers 31 and 32 and the silicon wafer 10 or the valve plate 20 and provide electric insulation and mechanical protection. The use of silicon substrates for the covers 31 and 32 has the advantage that the holes serving as inlet or outlet can be simply etched and no processing of sodium-containing glass is necessary. Furthermore, the electrodes 45 and 46 as well as the electrode connections 47 and 48 are diffused into the silicon substrates 311 and 321. In that way, vapor deposition or application of metallization is avoided which might modify the flow properties of the fluid within the microvalve. Since in this manufacturing process it is unnecessary to introduce the electrode connections through etched channels in the structurized silicon substrate 10, and likewise the subsequent closing off of these etched channels to prevent infiltration of the fluid, this embodiment of the microvalve is relatively simple to produce. This embodiment of the microvalve is thus advantageous because the liquids flowing through the valve must come into contact only with chemically stable materials, such as silicon oxide and silicon.

Figure 4:
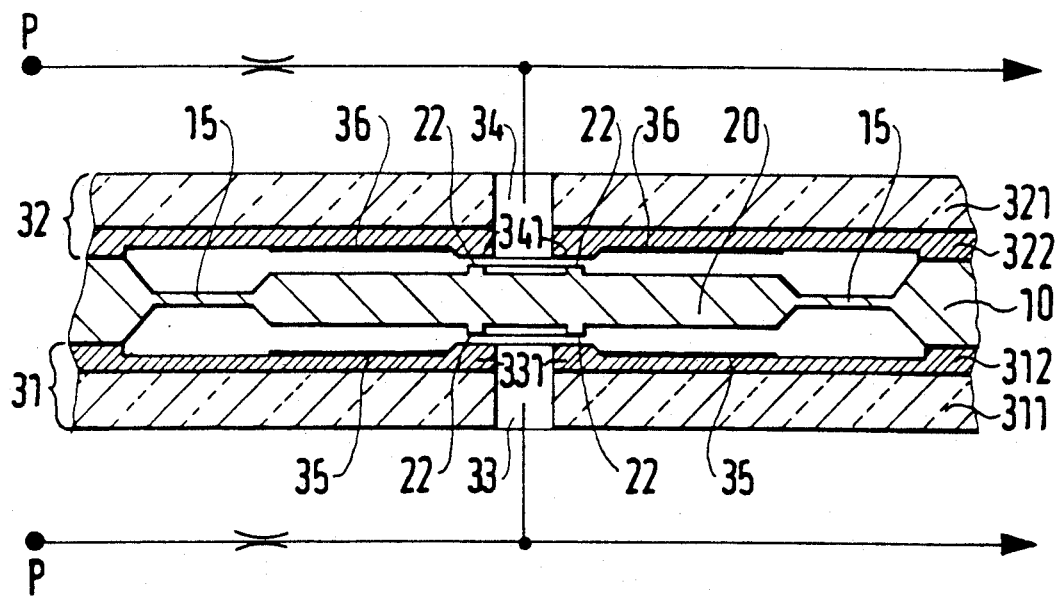
FIG. 4 is a cross section through a control valve.

The microvalves shown in FIGS. 1 and 3 lend themselves very well to use as switching valves with two or three switching positions. Application of the invention to continuously variable control valves is also contemplated, however, as shown for example in FIG. 4. There the middle layer of the valve again is provided by a structurized silicon substrate 10 with a valve plate 20 which is connected to the substrate by thin strips 15 and has a seal lip 22 in the region of the oppositely disposed openings 33 and 34. Streams of the valve liquid are present at both of the openings 33 and 34 of the valve, so that the valve represents a connection between fluid streams. By variation of the position of the valve plate 20 the effective flow-through cross section between the valve plate and one of the flow openings is changed. The flow quantity through the valve from one side to the other and the direction of the flow are determined by the position of the valve plate 20. This position is continuously variable, so that the valve can favorably find use as a control stage. The covers 31 and 32 consist in this embodiment, in each case, of a glass layer 312, 322, which faces the structurized silicon substrate 10. In the case of a two-layer construction of the covers 31 and 32 it is possible to provide either electrodes and electrode connections on the surfaces of the covers 31 and 32 facing the valve plate 20 or, alternatively, to diffuse the electrodes and electrode connections into the surfaces of the silicon substrates 311 and 312 which face the valve plate 20.

Although the invention has been described with reference to particular illustrative examples, it will be recognized that modifications and variations are possible within the inventive concept.

We claim:

1. An electrostatically controllable microvalve of multilayer construction comprising:
   a central silicon wafer having a frame portion and working portions, made by removal of silicon material from said wafer, located in space enclosed by said frame portion and leaving unoccupied a substantial portion of said enclosed space, said working portions comprising a valve plate and at least one flexible strip connecting said valve plate to said frame portion for resiliently holding said valve plate in said enclosed space;
   first and second cover members respectively bonded fluid-tight to opposite sides of said frame portion of said central wafer, said first and second cover members each having a perforation connectable with said enclosed space whereby one of said perforations may serve said microvalve as inlet and the other as outlet, both of said perforations being disposed opposite said valve plate and said valve plate being disposed and shaped for cooperation with at least one of said perforations as a closure member, and
   first and second electrodes respectively affixed to said first and second cover members so as to face opposite sides of said valve plate, said valve plate being insulated electrically from said first and second electrodes, and being connectable as a counter-electrode for said first and second electrodes for electrostatic driving of said valve plate.

2. The microvalve of claim 1, wherein said first and second cover members each consist of at least one layer which is a glass layer bonded to said frame portion of said central silicon wafer.

3. The microvalve of claim 2, wherein said first and second electrodes are provided with electrode connections and said electrodes and their electrode connections are each applied to a said cover member to which the respective electrode is affixed as a metallization shaped in contour.

4. The microvalve of claim 2, wherein said cover members each have a silicon substrate on one surface of which there is provided said glass layer for insulating the silicon substrate electrically from said central silicon wafer.

5. The microvalve of claim 3, wherein said first and second electrodes are each affixed to a said cover member as a metallization layer deposited on a portion of a surface of the respective cover member within a predetermined contour and are each provided with an electrode connection which extends, beyond said enclosed space, through an etched channel leading outward in said central silicon wafer, to the exterior of said microvalve.

6. The microvalve of claim 4, wherein said electrodes are provided with electrode connections and in each case an electrode and an electrode connection provided for the electrode are in the form of a portion of the silicon substrate of the respective cover member which has been modified by diffusion of a doping agent into the silicon substrate at a surface thereof facing said central silicon wafer.

7. The microvalve of claim 1, wherein said first and second electrodes are provided with electrode connections and said electrodes and their electrode connections are each applied to a said cover member to which the respective electrode is affixed as a metallization shaped in contour.

8. The microvalve of claim 4, wherein said first and second electrodes are each affixed to a said cover member as a metallization layer deposited on a portion of a surface of the respective cover member within a predetermined contour and are each provided with an electrode connection which extends, beyond said enclosed space, through an etched channel leading outward in said central silicon wafer, to the exterior of said microvalve.

9. The microvalve of claim 1, wherein said first and second electrodes are each affixed to a said cover member as a metallization layer deposited on a portion of a surface of the respective cover member within a predetermined contour and are each provided with an electrode connection which extends, beyond said enclosed space, through an etched channel leading outward in said central silicon wafer, to the exterior of said microvalve.

10. The microvalve of claim 1, wherein said cover members are each composed of a silicon substrate having at least one insulating layer on said substrate for electrically insulating said cover member from said central silicon wafer.

11. The microvalve of claim 10, wherein said insulating layers of said respective cover members are silicon oxide layers.

12. The microvalve of claim 10, wherein said electrodes are provided with electrode connections and in each case an electrode and an electrode connection provided for the electrode are in the form of a portion of the silicon substrate of the respective cover member which has been modified by diffusion of a doping agent into the silicon substrate at a surface thereof facing said central silicon wafer.

13. The microvalve of claim 11, wherein said electrodes are provided with electrode connections and in each case an electrode and an electrode connection provided for the electrode are in the form of a portion of the silicon substrate of the respective cover member which has been modified by diffusion of a doping agent into the silicon substrate at a surface thereof facing said central silicon wafer.

14. The microvalve of claim 1, wherein there are a plurality of said flexible strips connecting said valve plate to said frame portion of said central silicon wafer are disposed about a plurality of sides, not exceeding four sides, of said valve plate.

15. The microvalve of claim 14, wherein connections of said flexible strips to said valve plate are distributed about said valve plate so as to maintain said valve plate at the same angular relation to said frame portion when said valve plate is displaced with resilient deformation of said flexible strips.

16. The microvalve of claim 1, wherein said valve plate where it is shaped for cooperation with at least one of said perforations as a closure member, is provided with a sealing lip and said perforation with which said valve plate cooperates as a closure member is provided with a valve seat against which said lip is capable of being pressed by electrostatic force applied to a said electrode and said valve plate.

17. The microvalve of claim 6, wherein said valve plate is provided, on its side opposite that on which said sealing lip is located, with means for spacing said valve plate from the cover member located opposite thereto.

18. The microvalve of claim 6, wherein groove-like troughs are provided in said valve plate on its surfaces facing said cover members.

19. The microvalve of claim 1, having said electrodes and said valve plate connected in a control circuit for operation of said microvalve as a switching valve.

20. The microvalve of claim 1, having said electrodes and said valve plate connected in a control circuit for operation as a continuously variable control valve.

21. The microvalve of claim 1, wherein said perforations respectively of said first and second cover members are located opposite each other.

22. The microvalve of claim 21, wherein said first and second electrodes are provided with electrode connections and said electrodes and their electrode connections are each applied to a said cover member to which the respective electrode is affixed as metallization shaped in contour.

23. The microvalve of claim 21, wherein said cover members are each composed of a silicon substrate having at least one insulating layer on said substrate for electrically insulating said cover member from said central silicon wafer.

24. The microvalve of claim 23, wherein said electrodes are provided with electrode connections and in each case an electrode and an electrode connection provided for the electrode is in the form of a portion of the silicon substrate of the respective cover member which has been modified by diffusion of a doping agent into the silicon substrate at a surface thereof facing said central silicon wafer.

25. The microvalve of claim 23, wherein said insulating layers of said respective cover members are silicon oxide layers.

26. The microvalve of claim 25, wherein said electrodes are provided with electrode connections and in each case an electrode and an electrode connection provided for the electrode is in the form of a portion of the silicon substrate of the respective cover member which has been modified by diffusion of a doping agent into the silicon substrate at a surface thereof facing said central silicon wafer.

* * * * *